(12) United States Patent
Brusha

(10) Patent No.: US 6,259,968 B1
(45) Date of Patent: *Jul. 10, 2001

(54) METHOD AND APPARATUS FOR ESTABLISHING WORK POSITION OF MANUFACTURING TOOL

(75) Inventor: Christie F. Brusha, Warren, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/110,982

(22) Filed: Jul. 7, 1998

(51) Int. Cl.$^7$ .................................................. G05B 15/00
(52) U.S. Cl. ........................... 700/245; 700/180; 700/264
(58) Field of Search ..................................... 700/245, 251, 700/252, 254, 258, 264, 95, 114, 159, 180, 246; 228/102

(56) References Cited

U.S. PATENT DOCUMENTS

| | | | |
|---|---|---|---|
| 3,958,682 | 5/1976 | Martin | 198/19 |
| 4,063,075 | 12/1977 | Collom | 364/119 |
| 4,162,387 | 7/1979 | De Candia | 219/79 |
| 4,179,602 | 12/1979 | Maruyama et al. | 219/125.1 |
| 4,310,958 | 1/1982 | Balaud et al. | 29/26 A |
| 4,442,335 | 4/1984 | Rossi | 219/79 |
| 4,445,184 | 4/1984 | Noguchi | 364/513 |
| 4,653,739 | * 3/1987 | Moore | 269/61 |
| 4,667,866 | 5/1987 | Tobita et al. | 228/4.1 |
| 4,736,515 | 4/1988 | Catena | 29/714 |
| 4,737,611 | 4/1988 | Humblot | 219/86.25 |
| 4,744,500 | 5/1988 | Hatakeyama et al. | 228/4.1 |
| 4,811,891 | 3/1989 | Yamaoka et al. | 228/182 |
| 4,856,698 | 8/1989 | Marianne et al. | 228/4.1 |
| 4,883,939 | * 11/1989 | Sagi | 219/125.1 |
| 4,894,901 | 1/1990 | Soderberg | 29/428 |
| 4,973,813 | 11/1990 | Mitchell | 219/109 |
| 4,973,817 | 11/1990 | Kanno et al. | 219/121.63 |
| 5,014,204 | * 5/1991 | Kamimura et al. | 701/201 |
| 5,015,821 | 5/1991 | Sartorio et al. | 219/124.34 |
| 5,146,670 | * 9/1992 | Jones | 29/561 |
| 5,151,570 | 9/1992 | Sakurai | 219/86.25 |
| 5,186,304 | 2/1993 | Kaczmarek et al. | 198/346.1 |
| 5,246,316 | * 9/1993 | Smith | 408/1 |
| 5,265,317 | 11/1993 | Angel | 29/429 |
| 5,380,978 | 1/1995 | Pryor | 219/121.64 |
| 5,427,300 | 6/1995 | Quagline | 228/4.1 |
| 5,437,529 | 8/1995 | Kakida et al. | 414/225 |
| 5,512,726 | * 4/1996 | Arantes et al. | 219/125.1 |
| 5,782,317 | * 7/1998 | Lutz | 187/270 |
| 5,943,768 | * 8/1999 | Ray | 29/822 |
| 5,968,384 | * 10/1999 | Willems | 219/125.1 |
| 6,085,961 | * 7/2000 | Brusha | 228/102 |
| 6,089,440 | * 7/2000 | Brusha | 228/44.3 |

* cited by examiner

Primary Examiner—Thomas Lee
Assistant Examiner—Ri Jue Mai
(74) Attorney, Agent, or Firm—Mark P. Calcaterra

(57) ABSTRACT

A vehicle assembly tool includes a base and a frame pivotably coupled to the base. The frame is configured for holding a plurality of vehicle parts to be welded together. A motor is coupled to the frame via a gear system to move the frame relative to the base. Per the present disclosure, the base can be juxtaposed with a plurality of robotic welders, each having an end effector with six degrees of freedom, and the frame then moved relative to the base to essentially provide a seventh degree of freedom for welding the parts together. Also, the frame can be programmed to return, after welding, to one of several user-defined load positions, each of which load positions can be tailored to a respective individual for facilitating ergonomic loading of parts into the frame by the particular individual.

10 Claims, 3 Drawing Sheets

METHOD AND APPARATUS FOR ESTABLISHING WORK POSITION OF MANUFACTURING TOOL

FIELD OF INVENTION

The present invention relates generally to vehicle assembly, and more particularly to tools for holding vehicle parts in work positions during assembly.

BACKGROUND OF THE INVENTION

Vehicle assembly lines typically include robotic welders for welding parts of vehicles together to effect assembly. Ordinarily, the parts to be welded are first mounted in a frame in juxtaposition with each other, and then the frame is transported past the welders to assemble the parts.

To enable the robotic welders to weld parts together, end effectors having six degrees of freedom are associated with the welders. Consequently, the end effectors of the welders can move in accordance with a computer-controller program in six degrees of freedom, as required to undertake vehicle assembly. Representative of such assembly line systems is the "Robogate" system marketed by Comau of Italy.

While effective, such systems require several assembly lines, and the assembly lines generally require significant modifications to change the model of vehicle being assembled. As recognized by the present invention, however, it is possible to augment the versatility of a vehicle assembly line by essentially establishing a seventh degree of freedom during assembly.

Moreover, assembly line workers are required to load the parts to be assembled into their respective frames, prior to processing by the robotic welders. It will be appreciated that a frame which can be conveniently and ergonomically loaded by one person, however, may not facilitate easy and ergonomic loading by another person. Unfortunately, existing assembly frames do not provide for selectively establishing a load orientation that can be tailored to more than one person.

Accordingly, it is an object of the present invention to provide a vehicle assembly system which is adaptable to more than one model and versatile. Another object of the present invention is to provide a vehicle assembly system which can be used in conjunction with robotic welders having six degrees of freedom, to essentially establish a seventh degree of freedom. Still another object of the present invention is to provide a vehicle assembly system in which a plurality of user-selectable vehicle part loading positions can be established. Yet another object of the present invention is to provide a vehicle assembly system which is easy to use and cost-effective.

SUMMARY OF THE INVENTION

A computer program device having a computer readable memory is used to direct a digital processing apparatus to perform the inventive method steps disclosed herein. In other words, the program device is readable by the digital processing apparatus, and the program device tangibly embodies a program of instructions executable by the digital processing apparatus to perform the inventive steps disclosed below. Indeed, a digital processing apparatus itself is disclosed herein whose actions are directed by the computer program device to perform specific operational steps set forth by the computer program device. As intended by the present invention, the program device is realized in a critical machine component that causes the digital processing apparatus to perform method steps for establishing a plurality of preselected work positions for a vehicle assembly apparatus having a base and a frame movably engaged with the base, such that the frame can be moved to establish a seventh degree of freedom in a system that includes robotic welders having six degrees of freedom.

As intended by the present invention, the method steps include moving the frame to a desired work orientation relative to the base, and then generating a set signal when the frame is in the desired work orientation. Next, a position signal is generated that is representative of the work orientation. The position signal is then correlated to a preselected work orientation. A plurality of work positions can be established and programmed as necessary to establish a seventh degree of freedom during part processing.

In the preferred embodiment, the program product is used in combination with the frame and a motor coupled to the frame. It is further used in combination with a position sensor associated with the frame for generating the position signal. Still further, a data entry device can be included for generating the set signal.

In another aspect of the present invention, a computer-implemented method is disclosed for establishing a plurality of preselected work positions for a vehicle assembly apparatus having a base and a frame movably engaged with the base, such that parts of the vehicle can be oriented at a plurality of orientations relative to a robotic welder during processing. The method includes the steps mentioned above.

In yet another aspect of the present invention, a versatile system is disclosed for promoting vehicle part processing that is adaptable to various vehicle models without requiring changes to the processing hardware. The systems includes a plurality of robotic welders, each having a plurality of degrees of freedom, and a base is juxtaposed with the welders. A frame is movably coupled to the base, and a means for moving the frame relative to the base is provided. Also, a controller is electrically connected to the moving means. Likewise, a position sensor is electrically connected to the controller for generating a position signal representative of the orientation of the frame relative to the base, and a data input device is also electrically connected to the controller for generating a set signal.

In accordance with the present invention, computer code elements are accessible to the controller. These code elements and embody machine-readable instructions for executing method steps including receiving the position signal and recording the orientation of the frame upon receipt of the set signal, based on the position signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
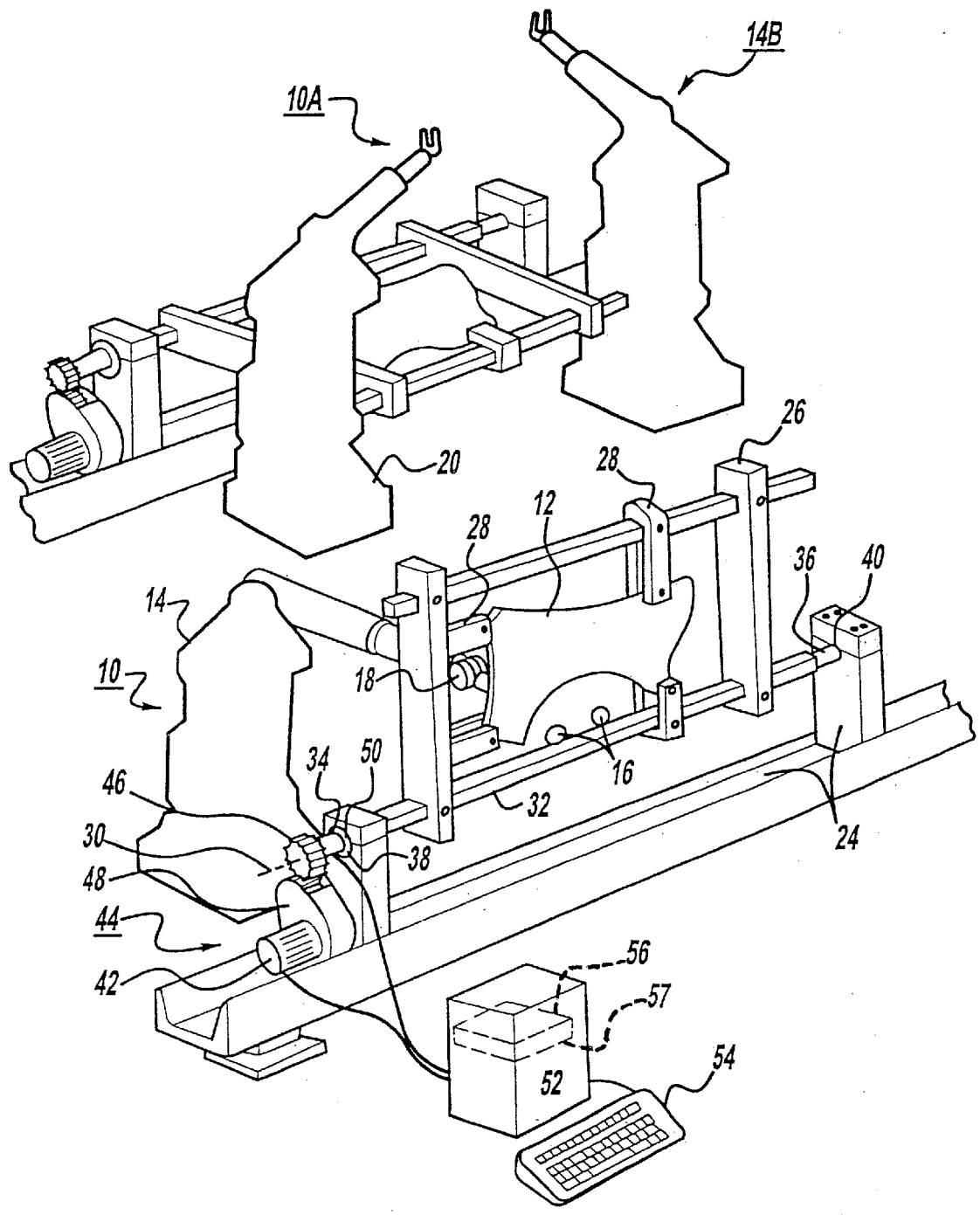
FIG. 1 is a perspective view of the vehicle assembly system of the present invention.

Referring initially to FIG. 1, a first system is shown and generally designated 10 for holding a vehicle part 12, such as a body quarter panel, in juxtaposition with a first plurality of robotic welders 14 to attach auxiliary parts 16 to the vehicle part 12. In one presently preferred embodiment, each robotic welder 14 includes an end effector 18 having six degrees of freedom. The welders 14 advantageously can be made by Comau of Italy.

As shown in FIG. 1, after welding by the first plurality of robotic welders 14, a transfer robot 20 can remove the vehicle part 12 from the first system 10 and position it in a second holding system 10A that is juxtaposed with a second plurality of the robotic welders 14B. It is to be understood that the second system 10A is substantially identical to the first system 10, and accordingly for clarity of disclosure the below discussion will focus on the first system 10. As disclosed more fully below, the vehicle part 12 is further processed by the welders 14 in the second plurality of welders 14B and then unloaded.

FIG. 1 shows that a track 22 is preferably disposed on the ground by the first plurality of welders 14. As shown, a metal base 24 is slidably or rollably engaged with the track 22. Accordingly, the metal base 24 can be moved past the welders 14 as appropriate for processing the vehicle part 12.

Additionally, a hollow metal frame 26 is movably engaged with the base 24. In accordance with principles well-known in the art, the frame 26 includes clamps 28 for holding the vehicle part 12 and the auxiliary parts 16.

It can be appreciated in reference to FIG. 1 that the frame 26 defines a long axis 30 that is generally parallel to the track 22 (and, hence, to the production line of the assembly system). Also, the frame 26 includes a lower edge 32 that is parallel to the axis 30. As shown in FIG. 1, two opposed pins 34, 36 protrude outwardly from the frame 26 at or just above the lower edge 32, and the pins 34, 36 are rotatably received in respective holes 38, 40 that are formed in the base 24. Accordingly, the frame 26 shown in FIG. 1 is pivotably engaged with the base 24 along the lower edge 32 of the frame 26.

A means is provided for moving the frame 26 relative to the base 24. In the embodiment shown in FIG. 1, the moving means is an alternating current (AC) servo-controlled motor 42. Alternatively, the moving means can be a direct current (DC) stepper motor (not shown) or a servo-controlled piston-and-cylinder actuator (not shown) that is connected to the base 24 and frame 26.

In the preferred embodiment shown, the motor 42 is mounted on the base 24 and is coupled to the frame 26 through a gear system, generally designated 44. Preferably, the gear system 44 includes a frame spur gear 46 that is attached to the frame 26. Per the present invention, the frame gear 46 is meshed with a reduction spur gear of a reduction gear assembly 48. In turn, the reduction gear assembly is coupled by means well-known in the art to the shaft of the motor 42.

Additionally, a position sensor is engaged with the frame 26 to sense the position of the frame 26 with respect to the base 24. In one preferred embodiment, the position sensor is a rheostat 50 that is mounted on the base 24 and engaged with one of the pins 34, 36 of the frame 26. In accordance with principles well-understood in the art, the rheostat 50 generates an electrical signal that is representative of the angular position of the pin 34/36 and, hence, that is representative of the orientation of the frame 26 with respect to the base 24.

It is to be appreciated in reference to FIG. 1 that both the rheostat 50 and motor 42 are electrically connected to a control console 52. In accordance with well-known principles, the control console 52 is any suitable robotic control console that can be programmed in accordance with the inventive steps below to activate the motor 42 to move the frame 26 relative to the base 24. In one presently preferred embodiment, the control console 52 is made by Comau of Italy. Accordingly, the control console 52 includes a data input device 54, such as an alpha-numeric keypad, and an electronic data processing and storage device 56, shown schematically in FIG. 1 in phantom. The data processing and storage device 56 implements a control module 57, as more fully disclosed below.

Figure 2:
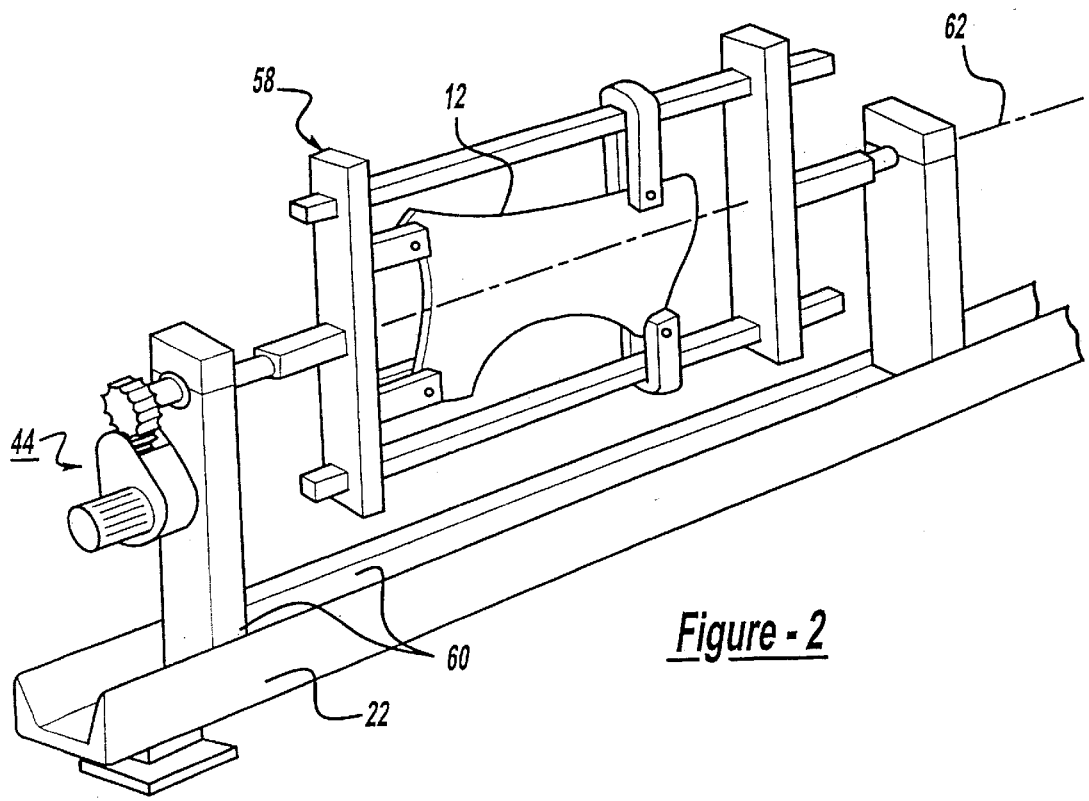
FIG. 2 is a perspective view of an alternate embodiment of the assembly system, showing the frame rotatably engaged with the base about the long axis of the frame.
Figure 3:
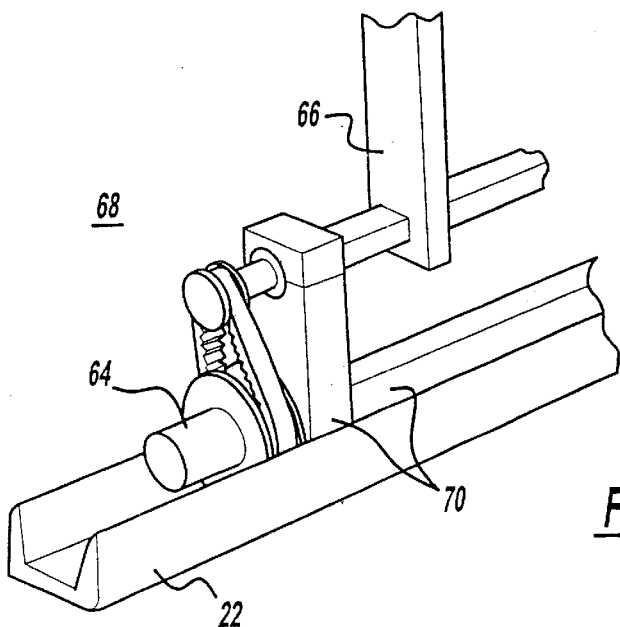
FIG. 3 is a perspective view of still another embodiment, showing the motor coupled to the frame y means of a drive belt.

FIGS. 2 and 3 show alternate frame-base combinations. For example, FIG. 2 shows that a frame 58 can be rotatably coupled to a base 60 about a central long axis 62 of the frame 58. As another alternative, FIG. 3 shows that a motor 64 can be coupled to a frame 66 via a toothed belt system, generally designated 68, for moving the frame 66 relative to a base 70.

Figure 4:
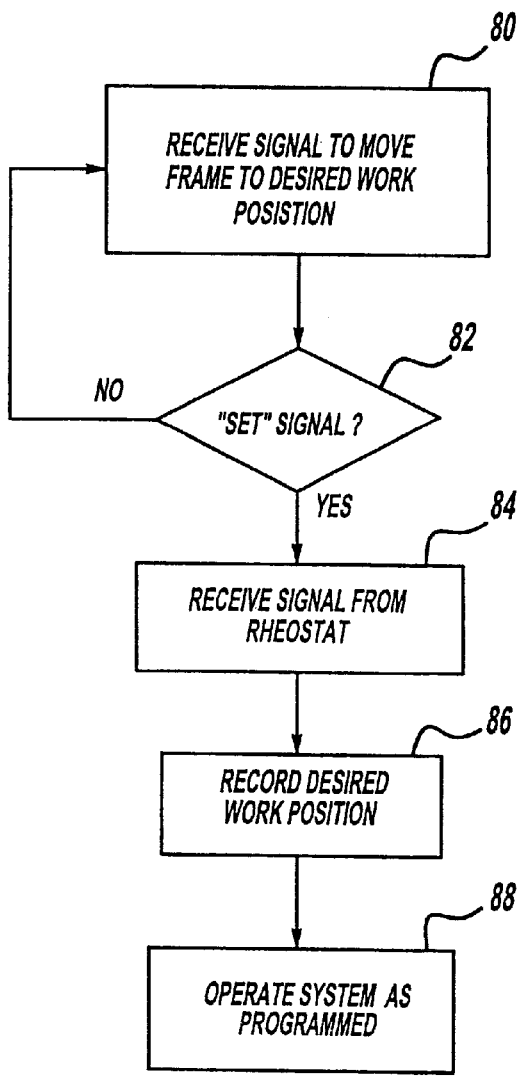
FIG. 4 is a flow chart showing the programmable load position steps of the present invention.
Figure 5:
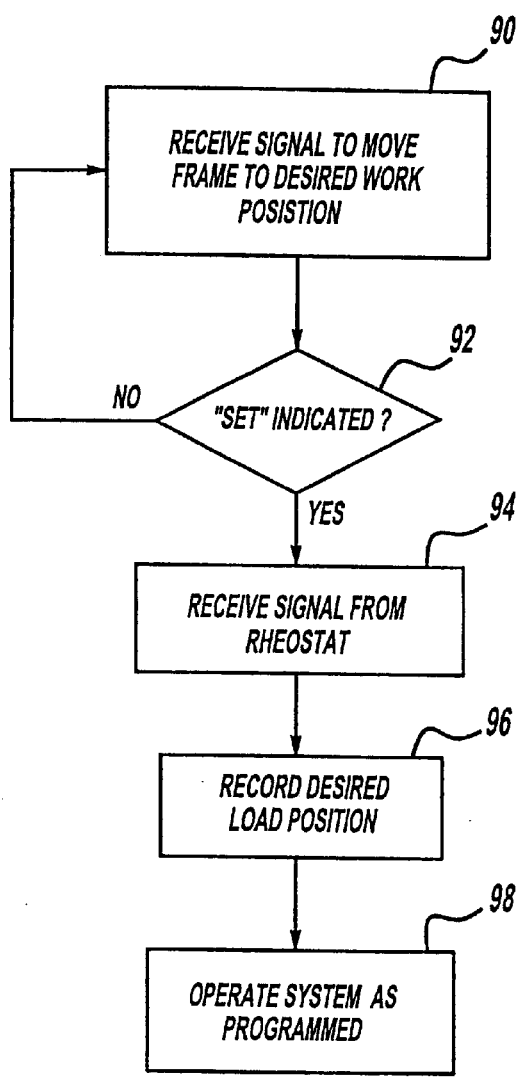
FIG. 5 is a flow chart showing the programmable work position steps of the present invention.

Now referring to FIGS. 4 and 5, the inventive computing steps of the present invention for establishing preselected load and work orientations of the frame 26 with respect to the base 24 can be seen. FIGS. 4 and 5 illustrate the structure of the control module 57 of the present invention as embodied in computer program software. Those skilled in the art will appreciate that the Figures illustrate the structures of computer program code elements that function according to this invention. Manifestly, the invention is practiced in one essential embodiment by a machine component that renders the computer program code elements in a form that instructs a digital processing apparatus (that is, a computer) to perform a sequence of operational steps corresponding to those shown in the Figures.

These instructions may reside on a program storage device including a data storage medium, such as a computer diskette. Alternatively, such media can also be found in semiconductor devices, on magnetic tape, on optical disks, on a DASD array, on a conventional hard disk drive, on electronic read-only memory or on electronic ransom access memory, or other appropriate data storage device. In an illustrative embodiment of the invention, the computer-executable instructions may be lines of compiled machine language code or C++ language code.

It is to be understood that the present invention can be implemented by logic circuits in the data processing and storage device 56. As yet another alternative, the present invention can be implemented by a circuit board (not shown), and the operative components of the control module 28 accordingly would be electronic components on the circuit board.

Referring in detail to FIG. 4, at block 80 the control module 57 receives an operator-generated signal to move the frame 26 to a desired load position. This signal can be generated by the operator by, e.g., appropriately manipulating the input device 54 (FIG. 1) to incrementally change the orientation of the frame 26 relative to the base 24 by incrementally moving the motor 42.

At decision diamond 82, the control module 57 determines whether the present orientation of the frame 26 has been "set" by the operator to be the desired load position. To indicate the desire to set the load position, the operator can generate a "set" signal by appropriately manipulating the input device 54. For example, the operator can depress an "ENTER" key on the device 54 when the device 54 is a keypad as shown, to thereby generate the "set" signal. Or, if the device is a mouse, the operator can generate the "set" signal by clicking the mouse.

In any case, if no "set" signal has been generated the control module 57 loops back to block 80, but otherwise the control module 57 proceeds to block 84. At block 84, the control module 57 receives a position signal from the rheostat 50 (FIG. 1). Then, at block 86, the control module 57 records the orientation of the frame 26, as indicated by the position signal, as the desired load position. At block 88, the control module 57 operates the system 10 as programmed.

In other words, after establishing and recording a preselected load orientation of the frame 26 which is preferably tailored to the particular operator, the control module causes the system 10 to move from the load position, wherein the operator conveniently loads parts to be processed into the frame 26, to various work positions, wherein the frame 26 moves as appropriate to facilitate processing of the parts. It is to be understood that the control module 57 can establish and store a plurality of load positions, each of which is tailored to a particular operator to thereby facilitate ergonomic loading of parts into the frame 26.

FIG. 5 shows that in addition to establishing one or more operator-tailored load positions, the control module 57 can be programmed to establish a plurality of work positions of the frame 26. Thereby, the versatility of the system 10 is enhanced, rendering it comparatively adaptable to changes in the production line. Stated differently, by programming the system 10 with one or more work positions, the six degrees of freedom afforded by conventional robotic welders is augmented by what is effectively a seventh degree of freedom.

Referring in detail to FIG. 5, at block 90 the control module 57 receives an operator-generated signal to move the frame 26 to a desired work position. This signal can be generated by the operator by, e.g., appropriately manipulating the input device 54 (FIG. 1) to incrementally change the orientation of the frame 26 relative to the base 24 by incrementally moving the motor 42.

At decision diamond 92, the control module 57 determines whether the present orientation of the frame 26 has been "set" by the operator to be the desired work position. To indicate the desire to set the work position, the operator can generate a "set" signal by appropriately manipulating the input device 54. For example, the operator can depress an "ENTER" key on the device 54 when the device 54 is a keypad as shown, to thereby generate the "set" signal. Or, if the device is a mouse, the operator can generate the "set" signal by clicking the mouse.

In any case, if no "set" signal has been generated the control module 57 loops back to block 90, but otherwise the control module 57 proceeds to block 94. At block 94, the control module 57 receives a position signal from the rheostat 50 (FIG. 1). Then, at block 96, the control module 57 records the orientation of the frame 26, as indicated by the position signal, as the desired work position. At block 98, the control module 57 operates the system 10 as programmed.

In other words, after establishing and recording a preselected work orientation of the frame 26, the control module causes the system 10 to move to the predetermined work position or positions that is/are appropriate for the particular vehicle model and production stage. It is to be understood that the control module 57 can establish and store a plurality of work positions, each of which is tailored to a particular step in vehicle assembly to thereby enhance the versatility of the system 10.

While the particular METHOD AND APPARATUS FOR ESTABLISHING WORK POSITION OF MANUFACTURING TOOL herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A computer program product comprising:
   a data storage device readable by a digital processing system; and
   a computer program embodied in the storage device and including instructions executable by the digital processing system for performing method steps for establishing a plurality of preselected work positions for a vehicle assembly apparatus having a base and a frame movably engaged with the base, such that the frame can be moved to establish a seventh degree of freedom in a system that includes robotic welders having six degrees of freedom, the method steps comprising:
   (a) moving the frame to a desired work orientation relative to the base;
   (b) generating a set signal when the frame is in the desired work orientation;
   (c) generating a position signal representative of the work orientation; and
   (d) correlating the position signal to a preselected work orientation.

2. The computer program product of claim 1, in combination with the frame and a motor coupled to the frame.

3. The combination of claim 2, further in combination with a position sensor associated with the frame for generating the position signal.

4. The combination of claim 3, further in combination with a data entry device for generating the set signal.

5. A computer-implemented method for establishing a plurality of preselected work positions for a vehicle assembly apparatus having a base and a frame movably engaged with the base, such that parts of a vehicle can be oriented at a plurality of orientations relative to a robotic welder during processing, comprising:
   (a) moving the frame to a desired work orientation relative to the base;
   (b) generating a set signal when the frame is in the desired work orientation;
   (c) generating a position signal representative of the work orientation; and
   (d) correlating the position signal to a preselected work orientation.

6. The computer-implemented method of claim 5, further comprising coupling a motor to the frame.

7. The method of claim 6, further comprising associating a position sensor with the frame for generating the position signal.

8. The method of claim 7, further comprising providing a data entry device for generating the set signal.

9. A system for promoting assembly line versatility during vehicle assembly using a plurality of movable robotic welders, comprising:
   a base juxtaposed with the welders;
   a frame movably coupled to the base;

a means for moving the frame relative to the base;

a controller electrically connected to the moving means;

a position sensor electrically connected to the controller for generating a position signal representative of the orientation of the frame relative to the base;

a data input device electrically connected to the controller for generating a set signal; and computer code elements accessible to the controller and embodying machine-readable instructions for executing method steps comprising:

receiving the position signal; and recording the orientation of the frame upon receipt of the set signal, based on the position signal.

10. The system of claim 9, wherein the recording step further comprises:

(a) moving the frame to a desired work orientation relative to the base; and (b) correlating the position signal to a preselected work orientation.

* * * * *